United States Patent
Woodward et al.

(10) Patent No.: US 6,842,133 B2
(45) Date of Patent: Jan. 11, 2005

(54) STROBE THROUGH DIFFERENTIAL SIGNALING

(75) Inventors: Ernest E. Woodward, Chandler, AZ (US); Malcolm H. Smith, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/427,163

(22) Filed: Apr. 30, 2003

(65) Prior Publication Data

US 2004/0217890 A1 Nov. 4, 2004

(51) Int. Cl.[7] .............................................. H03M 1/66
(52) U.S. Cl. ....................................... 341/144; 341/143
(58) Field of Search ................................ 341/118, 120, 341/143, 144, 155; 330/225, 258; 11/254, 257; 375/200, 206; 455/462, 465

(56) References Cited

U.S. PATENT DOCUMENTS

| | | | | | |
|---|---|---|---|---|---|
| 5,428,806 | A | * | 6/1995 | Pocrass | 710/104 |
| 5,589,763 | A | * | 12/1996 | Burns | 324/76.15 |
| 5,892,792 | A | * | 4/1999 | Walley | 375/152 |
| 6,280,081 | B1 | * | 8/2001 | Blau et al. | 374/1 |
| 6,333,953 | B1 | * | 12/2001 | Bottomley et al. | 375/316 |
| 6,486,735 | B1 | * | 11/2002 | Phanse et al. | 330/254 |
| 6,674,386 | B2 | * | 1/2004 | Carreau et al. | 341/155 |
| 2002/0042256 | A1 | * | 4/2002 | Baldwin et al. | 455/232.1 |
| 2004/0038662 | A1 | * | 2/2004 | Darabl | 455/323 |

* cited by examiner

Primary Examiner—Don Le
Assistant Examiner—Linh V Nguyen
(74) Attorney, Agent, or Firm—Lanny L Parker

(57) ABSTRACT

A system for two processors communicating though unidirectional links by embedding a strobe signal into the data by providing differential signals with different common mode signal levels.

18 Claims, 2 Drawing Sheets

STROBE THROUGH DIFFERENTIAL SIGNALING

BACKGROUND

Today's portable communication products utilize circuits that may perform a variety of applications. Some of the new applications are user defined and the more complex applications are even down loadable. A product's marketplace success may depend on a continual stream of upgrades and modified applications to enrich a product's features and functionality. At the same time, the user expects the products to include high data rate capabilities, sometimes at a reduced product size and cost.

Communication products may be based on a Digital Signal Processor (DSP) that implements communication protocols and interfaces with an applications processor. As such, there is a continuing need for better ways to allow the applications processor to properly transfer data with the DSP.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements are exaggerated relative to other elements for clarity.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Embodiments of the present invention may be used in a variety of applications, with the claimed subject matter incorporated into microcontrollers, general-purpose microprocessors, Digital Signal Processors (DSPs), Reduced Instruction-Set Computing (RISC), Complex Instruction-Set Computing (CISC), among other electronic components. In particular, the present invention may be used in smart phones, communicators and Personal Digital Assistants (PDAs), medical or biotech equipment, automotive safety and protective equipment, and automotive infotainment products. However, it should be understood that the scope of the present invention is not limited to these examples.

Further, the principles of the present invention may be practiced in wireless devices that are connected in a Code Division Multiple Access (CDMA) cellular network and distributed within an area for providing cell coverage for wireless communication. Additionally, the principles of the present invention may be practiced in Wireless Local Area Network (WLAN), Wide Area Network (WAN), Personal Area Network (PAN) and Local Area Network (LAN), among others.

Figure 1:
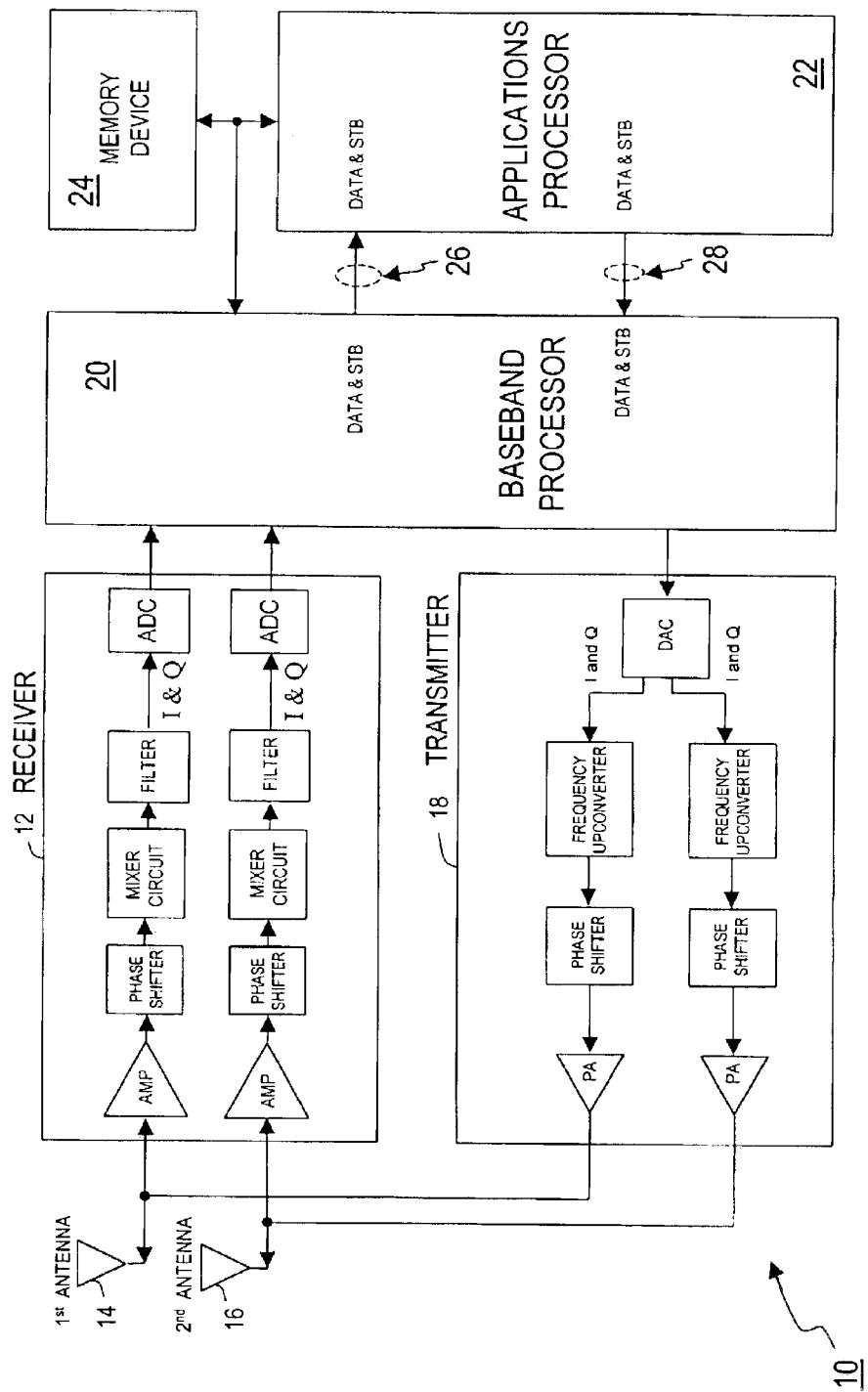
FIG. 1 is a block diagram that illustrates an interface between an applications processor and a digital signal processor.

FIG. 1 illustrates features of the present invention that may be incorporated into a wireless communications device 10. The transceiver may receive and transmit modulated signals from multiple antennas 14 and 16. In a receiver 12, first and second receiver chains may each include amplifiers such as, for example, Low Noise Amplifiers (LNAs) and Variable Gain Amplifiers (VGAs) to amplify signals received from the multiple antennas. Mixer circuits in the first and second receiver chains receive the modulated signals and down-convert the carrier frequency of the modulated signals. The down-converted signals may then be filtered and converted to a digital representation by Analog-To-Digital Converters (ADCs).

A baseband processor 20 may be connected to the ADCs to provide, in general, the digital processing of the received data within communications device 10. Baseband processor 20 may process the digitized quadrature signals, i.e., the in-phase "I" signal and the quadrature "Q" signal from the first and second receiver chains. In order for wireless communications device 10 to transmit data, transmitter 18 may receive digital data processed by baseband processor 20 and convert the digital data to analog signals for transmission from multiple antennas 14 and 16. Note that receiver 12 and/or transmitter 18 may be embedded with baseband processor 20 as a mixed-mode integrated circuit, or alternatively, the transceiver may be a stand-alone Radio Frequency (RF) integrated circuit.

An applications processor 22 may be connected to baseband processor 20 through a signaling interface 26 that allows data generated by baseband processor 20 to be transferred to applications processor 22. Interface 26 includes a number of N data signals, with N being an integer number equal to or greater than one. Another signaling interface 28 allows data generated by applications processor 22 to be transferred to baseband processor 20. Interface 28 includes a number of M data signals, where M is also an integer number equal to or greater than one. Storage registers or configuration registers (not shown) may be programmed in baseband processor 20 and in applications processor 22 to define and control the flow of data across interfaces 26 and 28.

A memory device 24 may be connected to baseband processor 20 and applications processor 22 to store data and/or instructions. In some embodiments, memory device 24 may be volatile memories such as, for example, a Static Random Access Memory (SRAM), a Dynamic Random Access Memory (DRAM) or a Synchronous Dynamic Random Access Memory (SDRAM), although the scope of the claimed subject matter is not limited in this respect. In alternate embodiments, the memory devices may be non-volatile memories such as, for example, an Electrically Programmable Read-Only Memory (EPROM), an Electrically Erasable and Programmable Read Only Memory (EEPROM), a flash memory (NAND or NOR type, including multiple bits per cell), a Ferroelectric Random Access Memory (FRAM), a Polymer Ferroelectric Random Access Memory (PFRAM), a Magnetic Random Access Memory (MRAM), an Ovonics Unified Memory (OUM), a disk memory such as, for example, an electromechanical hard disk, an optical disk, a magnetic disk, or any other device capable of storing instructions and/or data. However, it should be understood that the scope of the present invention is not limited to these examples.

Figure 2:
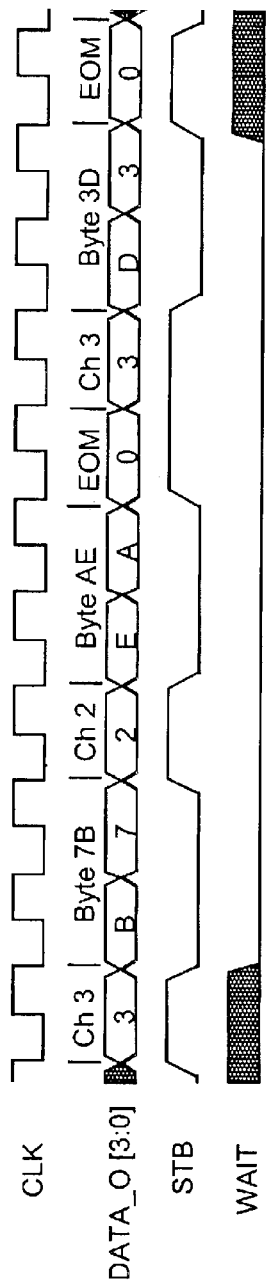
FIG. 2 is a timing diagram for data signals and information that may be transferred across the interface illustrated in FIG. 1.

FIG. 2 is a timing diagram showing waveforms for a clock signal CLK, multiple DATA signals, a strobe signal STB and a wait signal WAIT. As such, the waveforms are representative of the DATA signal(s) and the additional information that may be transferred using the DATA signal(s). Note in FIG. 1 that baseband processor 20 and applications processor 22 may communicate with one another using a serial signal path (where N and M equal one). Alternatively, baseband processor 20 and applications processor 22 may communicate using multiple data signal paths. For either embodiment, a clock signal CLK having transition edges corresponding to transitions of the data signal may be derived from the data, and therefore, note that interfaces 26 and 28 do not include a separate clock pin. Also, WAIT information that indicates the receive buffer may be full and further data transfers should be stopped may be supplied by a wait message embedded in the DATA signal(s), and therefore, further note that interfaces 26 or 28 do not include a separate wait pin.

A strobe signal STB indicates that a message is starting or that a message is ending. While the strobe signal is active, a channel number may be provided on the data signal paths to identify the channel from which data may be transferred or an End Of Message (EOM) may be sent. In accordance with features of the present invention, strobe information may be embedded with the data that is transferred between baseband processor 20 and applications processor 22. Accordingly, interfaces 26 or 28 do not include a separate strobe pin.

Referring to FIG. 2, data transfers in quad-bit mode are shown for channels 3 and 2 on an outbound link. In this example of data transfers, channel 3 sends one byte followed by data being sent from channel 2, which also sends one byte. Following data being transferred from channel 2, the data transfer is complete for that channel and the EOM channel is activated. The strobe signal indicates an EOM channel is active and that channel 3 is to now send one byte. Accordingly, following the end-of-message from channel 2, channel 3 sends one more byte and ends its message.

Figure 3:
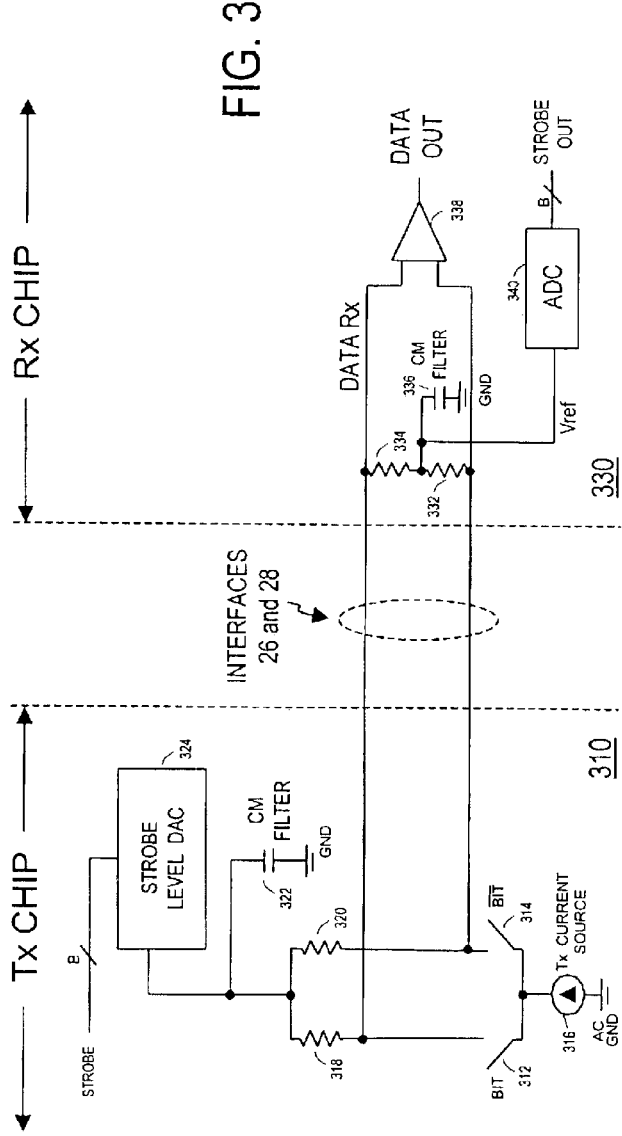
FIG. 3 is a diagram showing a signaling buffer on the transmit side and a receive buffer on the receive side of the baseband processor and an applications processor in accordance the present invention.

FIG. 3 is a diagram showing a signaling buffer on a send side 310 and a receive buffer on a receive side 330, representing the signaling buffer and receive buffer on both baseband processor 20 and applications processor 22. In combination, the signaling buffer on send side 310 and the receive buffer on receive side 330 provide a point-to-point interface for connecting two devices using source-synchronous, differential signaling. The interface consists of two unidirectional links, e.g., an outbound link and an inbound link. The two unidirectional links allow data to be transferred between two devices, where the data may further contain information for a clock, a wait message and/or a strobe.

As illustrated, the signaling buffer on send side 310 includes a pair of switches 312 and 314 having commonly connected source terminals that are coupled to AC ground through a current source 316. Switches 312 and 314 receive differential signals BIT and $\overline{BIT}$ and provide differential output signals from drain terminals to external pins at the interface. The drain terminals of switches 312 and 314 are further coupled though load impedances 318 and 320 to a Common Mode filter 322 and to a Digital-to-Analog Converter (DAC) 324. Although shown as a DAC, alternative circuits that receive a digital signal to control a voltage generator may be used.

The receive buffer on receive side 330 is connected to the interface and receives the differential output signal for providing a single-ended output signal DATA OUT from amplifier 338. Resistors 332 and 334 are serially connected across the input terminals of amplifier 338, with the common connection of the resistors connected to a CM filter 336 and further connected to an Analog-to-Digital Converter (ADC) 340.

Baseband processor 20 may be programmed to send data via interface 26 and receive data via interface 28. Likewise, applications processor 22 may be programmed to send data via interface 28 and receive data via interface 26. A process called "activating a channel" may multiplex channel data onto the outbound link by providing differential data to switches 312 and 314. The switches then generate differential signals that are supplied to the interface to indicate the value of the new channel. Channels are continuously activated or deactivated until all data transfers are complete. In accordance with features of the present invention, strobe information may be embedded with the data being communicated across the interface.

As shown in FIG. 3 for the signaling buffer, a strobe signal is provided to DAC 324 to set the common mode signal level for the data being transferred. By way of example, DAC 324 may set a 1.6V common mode signal level for a 200 mV differential signal to indicate that the strobe is logically off (inactive), but set a 1.0V common mode signal level for a 200 mV differential signal to indicate that the strobe is logically on (active). Neither the 1.0V nor the 1.6V Common Mode Signal Levels should be considered as limitations of the present invention. By setting the common mode signal level to different voltages, the data in the link has embedded information that signifies an active or inactive strobe. As shown in FIG. 3 for the receive buffer, a voltage Vref may be recovered from the received differential signals, then converted by ADC 340 to the signal STROBE OUT.

It should be pointed out that this technique of providing different common mode signal levels may be extended beyond two levels. A third common mode signal level may be used, for example, for node addressing and allow convenient extensions into a multi-point system with backwards compatibility features. Further, the source-synchronous, differential connections allow higher frequency differential signaling and a pin-count reduction.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method, comprising:

providing differential data signals to a device, where the differential data signals are provided having a first common mode signal level to indicate a strobe that is active and a second common mode signal level to indicate a strobe that is inactive.

2. The method of claim 1 further comprising:

using a Digital-to-Analog Converter (DAC) to provide the first common mode signal level when the strobe is active and the second common mode signal level when the strobe is inactive.

3. The method of claim 1 further comprising using the differential data signals to output a channel number when the strobe is active.

4. The method of claim 3 further comprising:

providing the channel number to identify a channel from which data may be selected.

5. The method of claim 1 further comprising:

using the differential data signals to supply the data as a channel value to indicate that a message is starting or that a message is ending while the strobe is active.

6. A device, comprising:

an interface to the device having two unidirectional links, a first link to send data and a second link to receive data, where the unidirectional links transfer differential signals having at least two DC voltage levels to indicate a strobe signal that is active and inactive.

7. The device of claim 6, further comprising:

a Digital-to-Analog Converter (DAC) coupled to receive the strobe signal and provide the at least two DC voltage levels used to generate the differential signals sent over the first link.

8. The device of claim 6, further comprising:

first and second serially connected resistors to receive the differential signals and provide a voltage reference from a common connection of the first and second serially connected resistors.

9. The device of claim 8, further comprising:

an Analog-to-Digital Converter (ADC) to receive the voltage reference and provide a strobe out signal.

10. The device of claim 9, wherein the strobe out signal is received with the data to indicate that a message is starting or that a message is ending while the strobe out signal is active.

11. A method, comprising:

inserting at least two common mode signal levels into a differential signal to provide a control signal embedded with data; wherein the data is supplied as a channel value to indicate that a message is starting or that a message is ending while the control signal is active.

12. The method of claim 11 further comprising:

using a Digital-to-Analog Converter (DAC) coupled to receive the control signal to provide the at least two common mode signal levels.

13. A system, comprising:

a baseband processor coupled to multiple antennas to receive quadrature signals;

a Static Random Access Memory (SRAM) memory coupled to the baseband processor; and an applications processor coupled to the baseband processor through a first link that transfers differential signals having a first common mode signal level to indicate a strobe that is active and a second common mode signal level to indicate a strobe that is inactive.

14. The system of claim 13, further including a second link, where the first link is a unidirectional inbound link to receive data and the second link is a unidirectional outbound link to send data.

15. The system of claim 14, further including a driver for the unidirectional outbound link that includes first and second switches coupled to receive data and provide a differential output signal having the first and second common mode signal levels.

16. The system of claim 15, wherein the driver further includes a Digital-to-Analog Converter (DAC) coupled to receive a strobe signal and provide the first and second common mode signal levels to the first and second switches.

17. The system of claim 15, wherein the driver further includes a digitally controlled voltage generator coupled to receive a strobe signal and provide the first and second common mode signal levels to the first and second switches.

18. The system of claim 15, further including:

first and second resistors coupled between a received differential signal and providing a reference voltage; and an Analog-to-Digital Converter (ADC) to receive the reference voltage and provide a strobe out signal.

* * * * *